US011998887B2

(12) United States Patent
Amador et al.

(10) Patent No.: US 11,998,887 B2
(45) Date of Patent: Jun. 4, 2024

(54) CONTINUOUS FLOW PHOTOREACTOR

(71) Applicant: Snapdragon Chemistry, Inc., Waltham, MA (US)

(72) Inventors: Adrian G. Amador, Framingham, MA (US); Matthew M. Bio, Belmont, MA (US); Timothy J. Doherty, Brighton, MA (US); Yuanqing Fang, Belmont, MA (US); Jillian Sheeran, Boston, MA (US); Ryan M. Spoering, Waltham, MA (US)

(73) Assignee: Snapdragon Chemistry, Inc., Waltham, MA (US)

( * ) Notice: Subject to any disclaimer, the term of this patent is extended or adjusted under 35 U.S.C. 154(b) by 396 days.

(21) Appl. No.: 16/986,503

(22) Filed: Aug. 6, 2020

(65) Prior Publication Data

US 2021/0039063 A1 Feb. 11, 2021

Related U.S. Application Data

(60) Provisional application No. 62/883,412, filed on Aug. 6, 2019.

(51) Int. Cl.
*B01J 19/12* (2006.01)
*B01J 19/00* (2006.01)

(52) U.S. Cl.
CPC ......... *B01J 19/127* (2013.01); *B01J 19/0013* (2013.01); *B01J 19/006* (2013.01);
(Continued)

(58) Field of Classification Search
CPC .... B01J 19/127; B01J 19/0013; B01J 19/006; B01J 2219/0869; B01J 2219/0871;
(Continued)

(56) References Cited

U.S. PATENT DOCUMENTS 4,456,512 A 6/1984 Bieler et al.
8,642,326 B1 2/2014 Schaefer et al.
(Continued)

FOREIGN PATENT DOCUMENTS

CN 102056848 A 5/2011
CN 103657363 A 3/2014
(Continued)

OTHER PUBLICATIONS

International Search Report and Written Opinion dated Oct. 14, 2020 for Application No. PCT/US2020/045179, 6 pages.
(Continued)

*Primary Examiner* — Xiuyu Tai
(74) *Attorney, Agent, or Firm* — COOLEY LLP

(57) ABSTRACT

Embodiments described herein relate generally to continuous flow photoreactors with easily replaceable and adjustable components. The photoreactor includes a reactor flow system, a lighting system, and a temperature control system. The reactor flow system includes a reactor inlet port, a reactor outlet port, and a length of reactor tubing fluidically coupled to the reactor inlet port and reactor outlet port. The lighting system includes a light emitting apparatus (e.g., a plurality of LEDs) configured to emit light in a defined wavelength range toward the length of reactor tubing. The temperature control system includes an inlet port, an outlet port, and a length of temperature control tubing fluidically coupled to the inlet port and the outlet port. In some embodiments, the temperature control system can be configured to circulate a fluid to cool the lighting system.

24 Claims, 9 Drawing Sheets

(52) U.S. Cl.
CPC .................. *B01J 2219/0869* (2013.01); *B01J 2219/0871* (2013.01); *B01J 2219/1203* (2013.01)

(58) Field of Classification Search
CPC .............. B01J 2219/1203; B01J 19/249; B01J 2219/0888; B01J 2219/1206; B01J 2219/1281; B01J 2219/1296; B01J 2219/2462; B01J 2219/2453; B01J 2219/0877; B01J 2219/2483; B01J 2219/2496; B01J 2219/2458; B01J 19/2415; B01J 19/0093; B01J 2219/00936; B01J 2219/00011; B01J 2219/00083; B01J 2219/00792
See application file for complete search history.

(56) References Cited

U.S. PATENT DOCUMENTS

| | | | |
|---|---|---|---|
| 2008/0164422 A1 | 7/2008 | Kim | |
| 2008/0299017 A1 | 12/2008 | Sattler et al. | |
| 2010/0190227 A1 | 7/2010 | Dauth et al. | |
| 2012/0085516 A1* | 4/2012 | McClellan | ............ F21V 15/013 |
| | | | 165/185 |
| 2013/0224841 A1 | 8/2013 | Bliss | |
| 2017/0173553 A1* | 6/2017 | Gremetz | ................ B01J 19/127 |
| 2018/0231576 A1 | 8/2018 | Hu et al. | |
| 2020/0214306 A1* | 7/2020 | Mortensen | ................ A23L 3/28 |

FOREIGN PATENT DOCUMENTS

| | | |
|---|---|---|
| CN | 106457197 A | 2/2017 |
| CN | 107486115 A | 12/2017 |
| JP | 2012/089755 A | 5/2012 |
| TW | 200738328 A | 10/2007 |
| WO | WO 2013/030247 A1 | 3/2013 |
| WO | WO-2015118317 A1 | 8/2015 |
| WO | WO 2015/148279 A1 | 10/2015 |
| WO | WO-2016120637 A1 | 8/2016 |

OTHER PUBLICATIONS

Office Action and Search Report for Chinese Application No. CN20208061353.6 dated Jul. 8, 2023, 18 pages.
Office Action for European Application No. EP20758058 dated Aug. 7, 2023, 7 pages.
Office Action and Search report for Chinese Patent Application No. CN202080061353.6 dated Mar. 28, 2024, 12 pages.

* cited by examiner

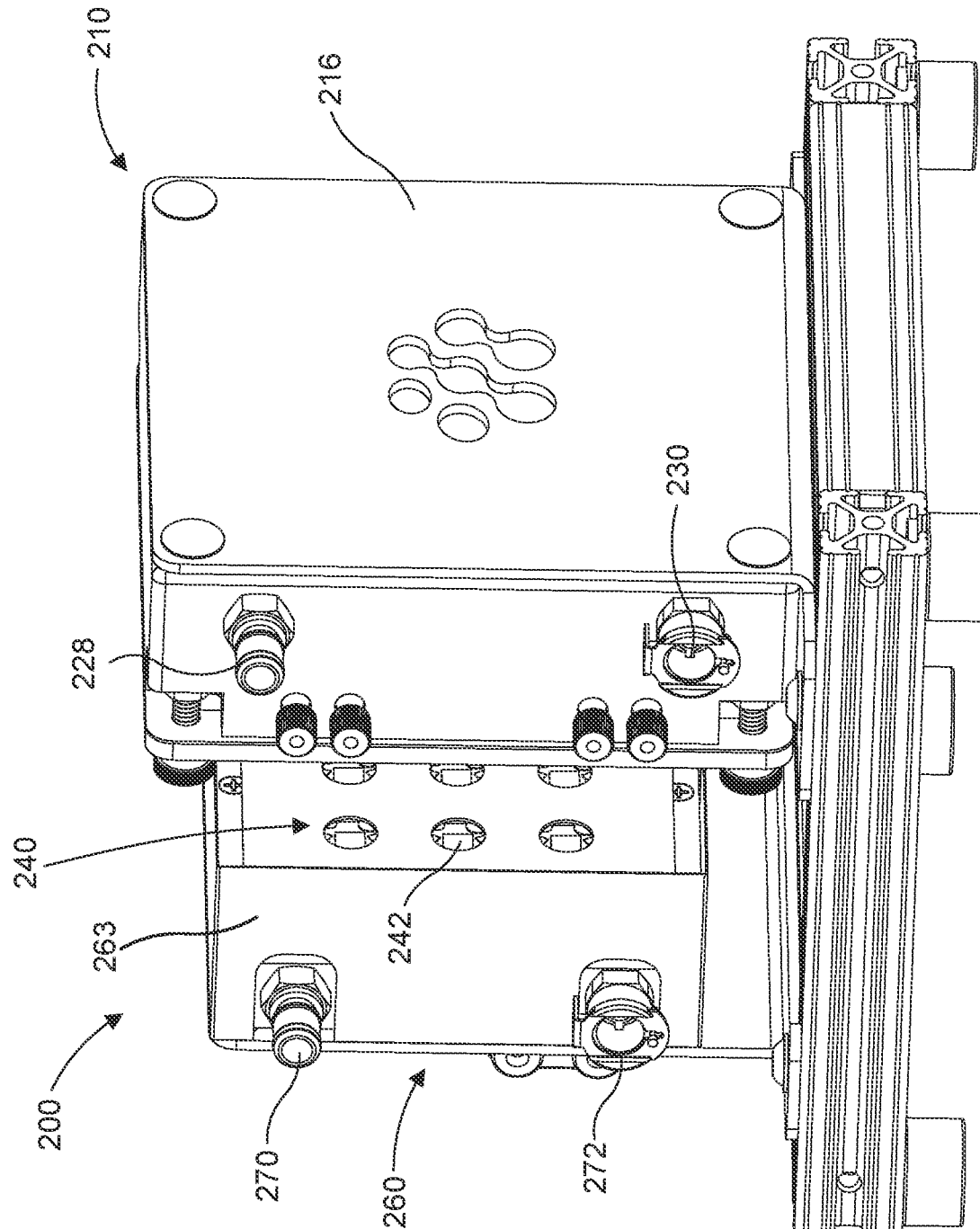

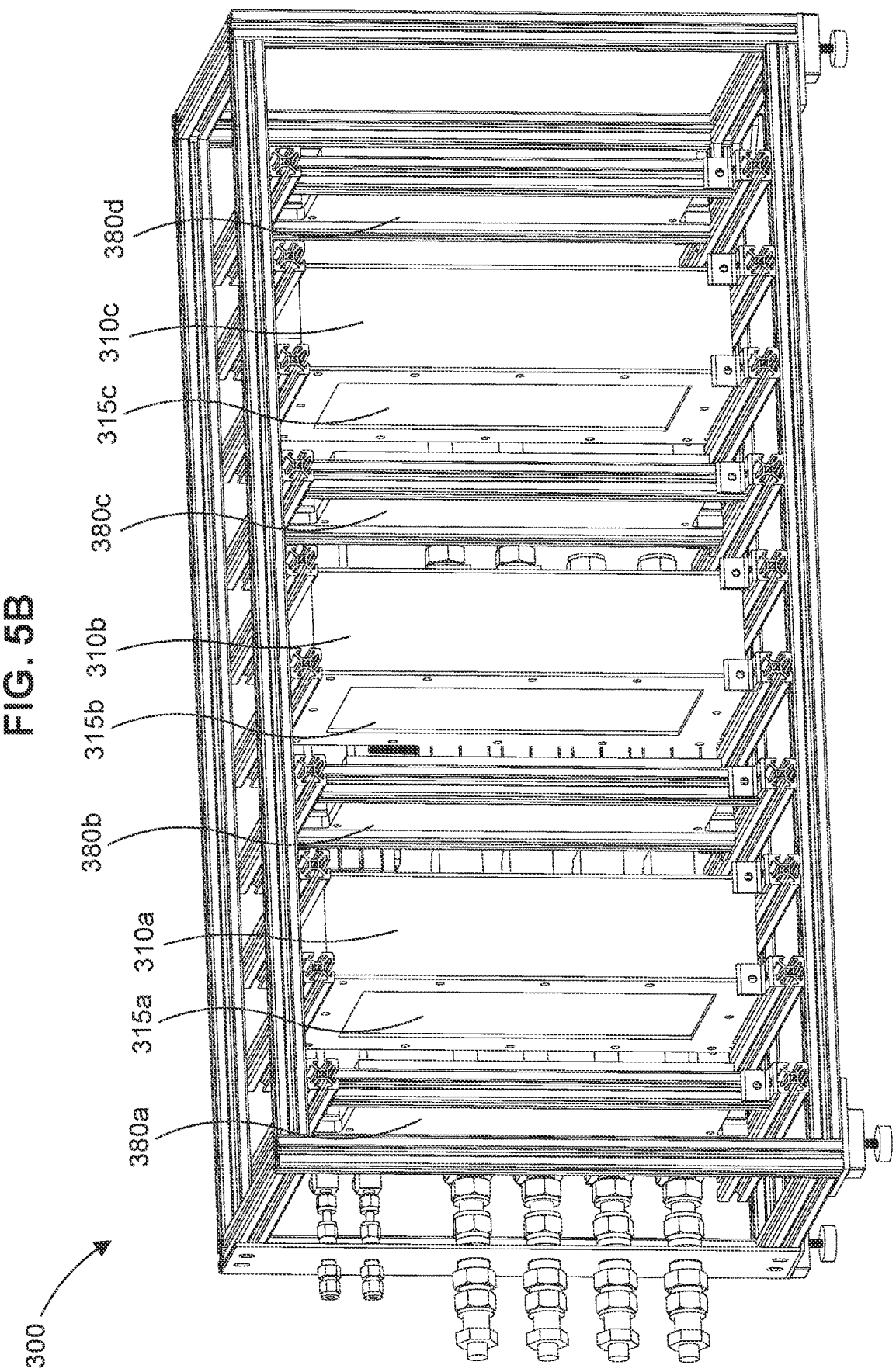

CONTINUOUS FLOW PHOTOREACTOR

CROSS-REFERENCE TO RELATED APPLICATIONS

This application claims priority to and benefit of U.S. Provisional Application No. 62/883,412, filed Aug. 6, 2019 and entitled "Continuous Flow Photoreactor", the entire disclosure of which is hereby incorporated by reference herein in its entirety.

BACKGROUND

Photoreactors are vessels or systems that can facilitate a photochemical reaction. Photoreactors generally include a reaction vessel and a light source. The reaction vessel can be transparent such that reactants within the reaction vessel can receive light from the light source. Use of a photoreactor to produce a desired product is often difficult and inefficient, either in terms of product yield or in terms of time. Adjustable light intensity, wavelength, light absorption depth, and temperature control are important parameters to improve the efficiency of photoreaction. However, these are not well achieved in existing photoreactors. In addition, for a traditional fixed plate-based photoreactor, replacement of photoreactor components is often an expensive and time-consuming process that involves prolonged shutdown of the photoreactor.

SUMMARY

Embodiments described herein relate generally to continuous flow photoreactors with easily replaceable and adjustable components. The photoreactor includes a reactor flow system, a lighting system, and a temperature control system. The reactor flow system includes a reactor inlet port, a reactor outlet port, and a length of reactor tubing fluidically coupled to the reactor inlet port and reactor outlet port. The lighting system includes a light emitting apparatus (e.g., a plurality of LEDs) configured to emit light in a defined wavelength range toward the length of reactor tubing. The temperature control system includes an inlet port, an outlet port, and a length of temperature control tubing fluidically coupled to the inlet port and the outlet port. In some embodiments, the temperature control system can be configured to circulate a fluid to cool the lighting system. In some embodiments, the lighting system and the temperature control system can be disposed in a housing. In some embodiments, the temperature control system can be placed in close proximity to the lighting system. In some embodiments, the temperature control system can be physically attached to the lighting system. In some embodiments, the temperature control system can be purged with dry inert gas or air to prevent moisture condensation on transparent surfaces within the temperature control system.

BRIEF DESCRIPTION OF THE DRAWINGS

FIGS. 2A-2B are perspective views of a photoreactor, according to an embodiment.

FIGS. 5A-5B are perspective views of a photoreactor with multiple reactor flow systems, multiple lighting systems, and multiple temperature control systems, according to an embodiment.

DETAILED DESCRIPTION

Figure 1:
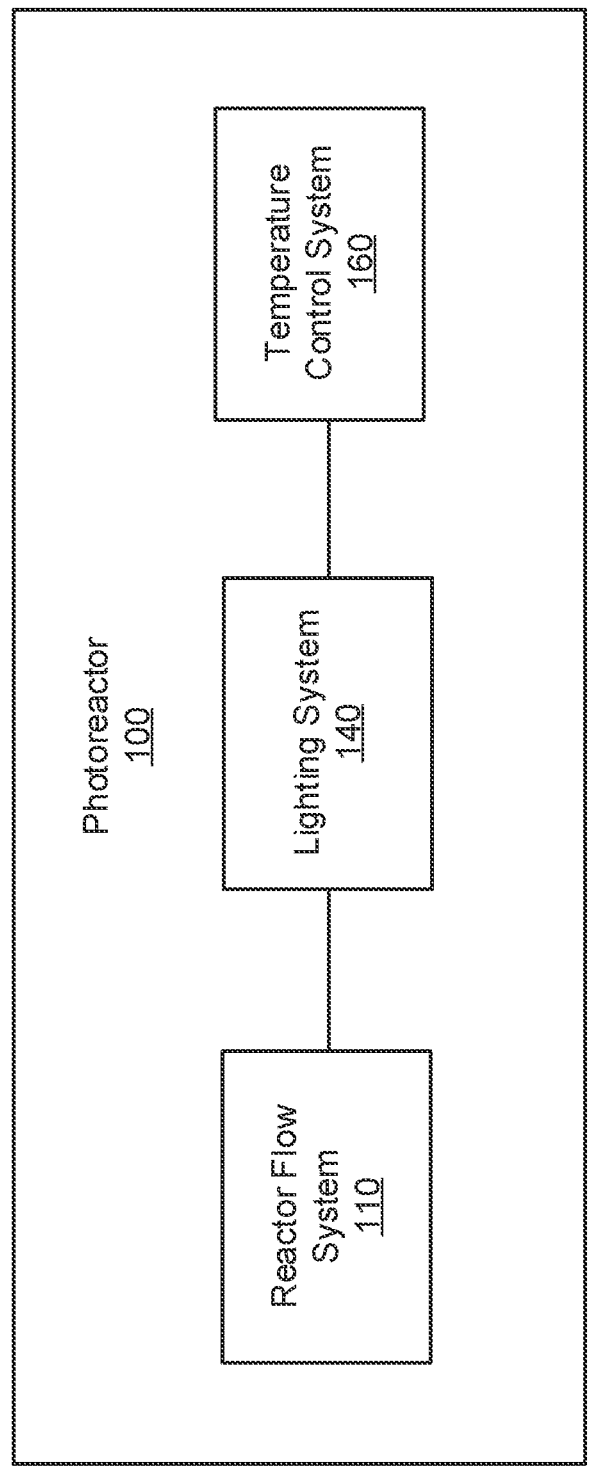
FIG. 1 is a schematic illustration of a photoreactor, according to an embodiment.
Figure 2A:
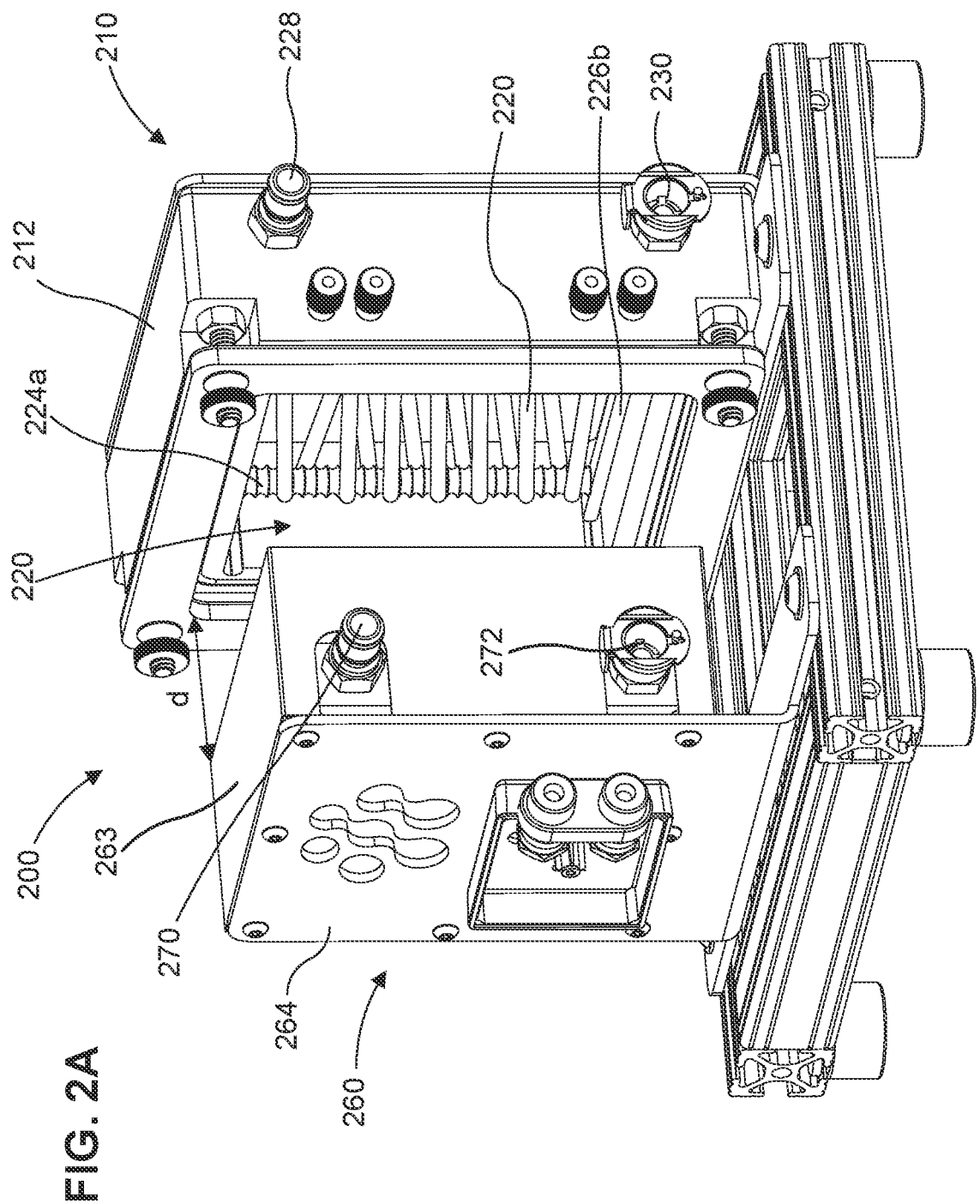
Figure 3:
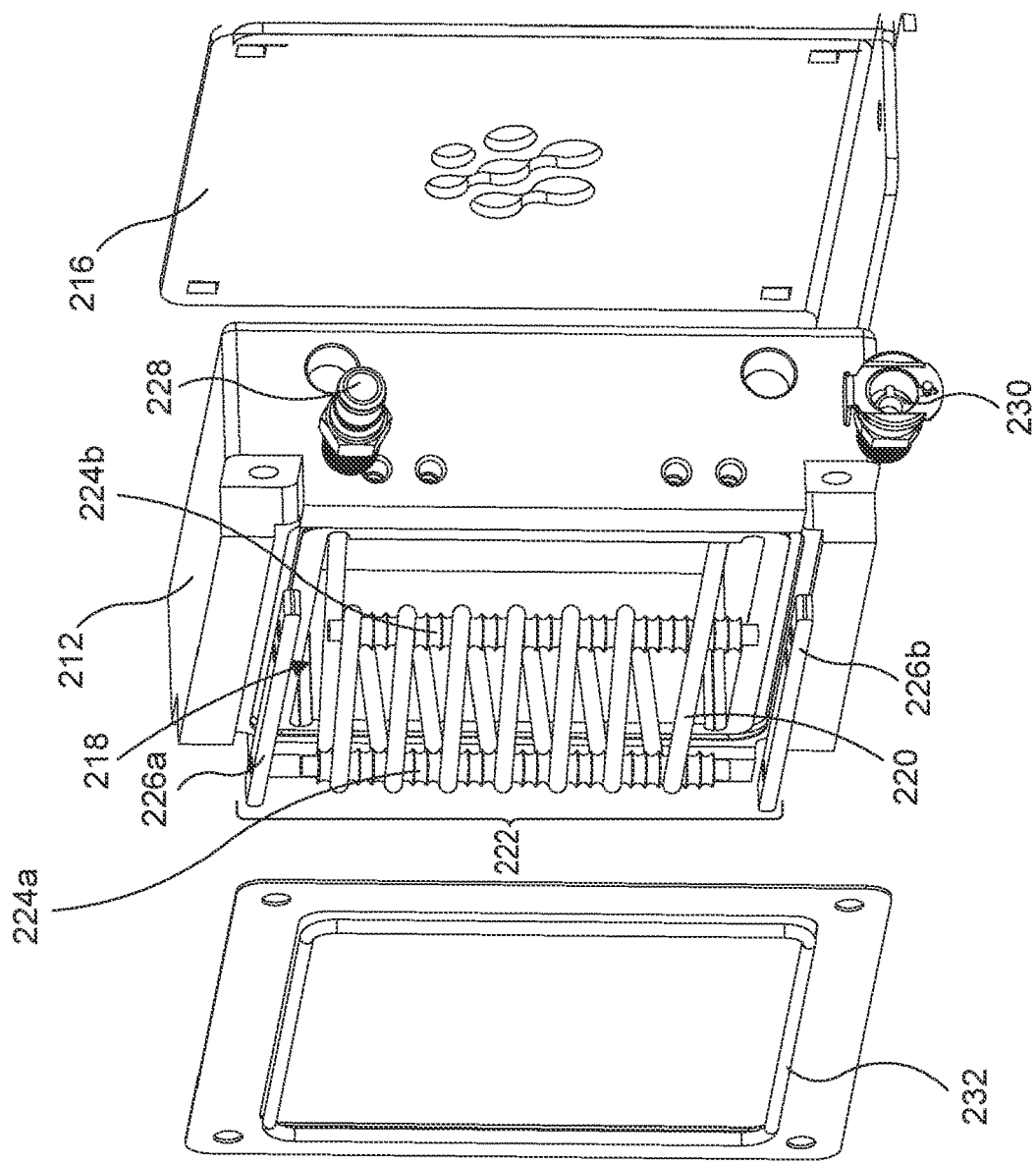
FIG. 3 is an exploded view of a reactor flow system, according to an embodiment.

Embodiments described herein relate generally to continuous flow photoreactors with easily replaceable and adjustable parts, and more specifically to continuous flow photoreactors with adjustable and/or replaceable LED lights and a temperature control system to control the temperature of the LED lights and/or the photoreactor. As described herein, a photoreactor is a vessel in which a photochemical reaction takes place. A photochemical reaction is a reaction initiated by the absorption of energy in the form of light. Upon absorbing light, a molecule can transform into an excited state, whose chemical and physical properties differ from the original molecule. Photosynthesis is an example of a photochemical reaction, in which incident light facilitates electron transfer to convert carbon dioxide and water into oxygen and carbohydrates. Other examples of photochemical reactions include Norrish reactions, dimerization of alkenes, and the closure of 1,3-butadiene to cyclobutene. Photoreactors typically include a transparent vessel, in which a reaction occurs. Photoreactor temperature is regulated by air or transparent thermal transfer fluid. Photoreactors also include a light source. The light source can generally be either a solar or an artificial light source.

Given the relatively slow reaction times of photochemical reactions, photoreactors are often operated in a batch configuration in order to achieve the desired light exposure time to facilitate the photochemical reaction or reactions to a reasonable conversion rate. In some cases, this involves a light source attached to the outer surface of a reactor tank. Alternatively, the light source can be housed within an inner tube, surrounded by the reaction vessel. Many other implementations of the batch design are also possible. While batch reactors can be beneficial in achieving a desired conversion rate, they are typically unable to achieve the same throughput as continuous flow reactors. Additionally, automation is more difficult with a batch photoreactor, therefore, labor costs are typically more significant for batch photoreactors. Shutdowns are also common in batch photoreactors and much rarer in continuous photoreactors. Product yields from batch photoreactors tend to be somewhat limited compared to yields from continuous flow photoreactors.

While a continuous flow photoreactor design has several advantages over a batch photoreactor design, the continuous flow design also comes with some drawbacks. In a continuous flow photoreactor, equipment costs tend to be more significant than for batch photoreactors. This is generally due to the overall complexity of the continuous system. Light absorption depth is fixed in plate-based microfluid photoreactors, which often results in inefficient use of light. In order to maintain the desired product concentrations at each point within the photoreactor, the processing parameters of the continuous flow system are controlled more rigidly than in a batch operation. Because of the interdependence of each process unit on each other, replacement of components in continuous flow photoreactors is often a complex and time-consuming process. Component replacement can sometimes involve long shutdown times and a significant loss in product yield. An important improvement in continuous flow photoreactors lies in the ease of component replacement, both in terms of photoreactor down time and cost of components.

While a light source is an important component of a photoreactor, there are several possible delivery systems and methods. While solar radiation is naturally occurring and has a low cost of delivery, it does not deliver a consistent wavelength or intensity. Therefore, an outdoor photoreactor that relies on solar radiation as its light source can have large fluctuations in product quality and yield from one day to the next. Incandescent and fluorescent lights can deliver a consistent and reliable light source, but also have certain drawbacks. For example, these lights typically deliver light over a large wavelength range. These lights are generally less efficient in photon generation and light intensity is more difficult to adjust. While the light incident upon the photoreactor vessel can include photons in a wavelength range to facilitate the desired photochemical reaction, it can also include photons outside of the desired wavelength range. These photons can either facilitate undesired side photochemical reactions or they can be absorbed, raising the temperature within the reaction vessel.

LEDs can help minimize several of the issues inherent to the other light delivery methods. LED wavelength can be controlled within a relatively narrow range, thereby minimizing side reactions and undesired heat generation. Since an LED bulb has much higher efficiency in converting electrical energy to photons, its relative energy use is lower, which can lead to lower overall energy and maintenance costs. Also, given the relatively low heat generation from LEDs, the amount of thermal fatigue on the components of the light bulb and on the other components of the photoreactor, can be relatively minimal. This can lead to a longer lifetime for the components of the photoreactor.

Temperature regulation is an additional aspect of photoreactor design operation that is ripe for improvement. While LEDs generate less heat than other light sources, the heat generated is still sufficient that it can influence the reactions within the photoreactor. Undesired side reactions can reduce the quality of the product, thereby reducing its value. Therefore, a temperature control system can be used with a photoreactor in order to keep the reaction temperature within a desired range.

FIG. 1 is a schematic illustration of a photoreactor 100, according to an embodiment. As shown, the photoreactor 100 includes a reactor flow system 110, a lighting system 140, and a temperature control system 160. The reactor flow system 110 includes a housing that defines an inner volume, in which a desired photochemical reaction takes place. In some embodiments, the housing can include an inlet port that receives reactant and an exit port that expels product. In some embodiments, the housing can include one or more translucent or substantially transparent surfaces. A length of tubing can be disposed in the inner volume and fluidically coupled to the inlet port and the outlet port. In some embodiments, the length of tubing can be coiled around a post or series of posts. Coiling the tubing can make the flow path of the reactant more tortuous and therefore longer than a simple flow path. A lengthened reactor flow path can increase the residence time of the reactant within the tubing. In some embodiments, the tubing can be translucent or substantially transparent. In some embodiments, the tubing can be a flexible material. The tubing and/or the post or posts are easily replaceable. For example, the posts can be coupled to a set of bars that can easily slide into and out of a groove within the inner volume of the housing.

In some embodiments, the reactor flow system 110 can include a reactant reservoir. In some embodiments, the reactor flow system 110 can include a product reservoir. In some embodiments, the reactor flow system can include one or more pumps that circulate reagent through the tubing. In some embodiments, reagent can be circulated through the reactor flow system 110 with variable temperature control. In some embodiments, reagent can be circulated through the reactor flow system 110 at a fixed temperature. In some embodiments, the reagent can be recycled, such that the reagent circulates through the tubing multiple times.

The lighting system 140 is arranged and configured to direct light toward the reactor flow system 110. In some embodiments, the lighting system 140 can include one or more LEDs. In some embodiments, each LED can be easily removed and replaced. Replaceable LEDs can allow an operator significant variability in the operational parameters of the photoreactor 100. For example, LEDs emitting light at a first wavelength can be replaced by LEDs emitting light at a second wavelength, the second wavelength different from the first wavelength. This tuning of the wavelengths of the incident light can make the photoreactor 100 appropriate for a broad range of photochemical reactions.

The temperature control system 160 is disposed and configured to either absorb heat generated by the lighting system 140 or to provide additional heat to the reactor flow system 110. In some embodiments, the temperature control system 160 can include a tube, a series of tubes, or other fluid flow path that circulates a fluid in close proximity to the lighting system 140. In some embodiments, the temperature control system 160 can circulate fluid in close proximity to the reactor flow system 110. In some embodiments, the temperature control system 160 can circulate fluid in close proximity to the reactor flow system 110 and the lighting system 140. In some embodiments, the fluid that flows through the temperature control system 160 can be kept at a fixed temperature. In some embodiments, the fluid that flows through the temperature control system 160 can have a varying temperature. Similar to the reactor flow system 110, the temperature control system 160 can include tubes that follow a path with high tortuosity in order to maximize the amount of time the fluid spends in close proximity to the lighting system 140 and/or the reactor flow system 110. If the fluid is a cooling fluid, a tortuous flow path can maximize the amount of heat transferred from the lighting system 140 and/or the reactor flow system 110 to the temperature control system 160. Conversely, if the fluid is a heating fluid, a tortuous flow path can maximize the amount of heat transferred from the temperature control system 160 to the lighting system 140 and/or the reactor flow system 110.

FIGS. 2A, 2B, 3, and 4 are schematic illustrations of a photoreactor 200, according to an embodiment. As shown, the photoreactor 200 includes a reactor flow system 210, a lighting system 240, and a temperature control system 260. The reactor flow system 210 includes a housing 212, a window 214, and a bracket 216 that collectively define an inner volume 218. In some embodiments, the reactor flow system 210 can include reactor tubing 220 and a tubing support assembly 222. In some embodiments, the tubing support assembly 222 can include support members 224a, 224b (collectively referred to as support members 224) and support rails 226a, 226b (collectively referred to as support rails 226). The reactor flow system 210 also includes an inlet port 228 and an outlet port 230, both of which are fluidically coupled to the reactor tubing 220. In some embodiments, the reactor flow system 210 can have a rectangular prism shape, a cylindrical shape, a spherical shape, or any combination thereof.

In some embodiments, the housing 212, the window 214, and bracket 216 can be held together by several fasteners or mechanical couplings. In some embodiments, the window 214 can be translucent. In some embodiments, the window 214 can be substantially transparent. In some embodiments, the window 214 can be composed of a material that partially or substantially controls the wavelength of the light that passes through the transparent window. In some embodiments, the window 214 can be composed of Pyrex®, glass, polyvinyl chloride (PVC), poly-methyl methacrylate, polycarbonate, clear resins (e.g., polyester casting resin), transparent ceramics (e.g., aluminum oxynitride), cellophane, Plexiglas®, fused quartz, or many other translucent or substantially transparent materials. In some embodiments, the window 214 can include an additional layer that modifies its transparent properties (e.g., frosted acrylic sheet for frosted glass, a tinting layer). In some embodiments, the window material can include additive that modifies its transparent properties (e.g., food dye, glass paint). In some embodiments the window 214 can include an on-board cleaning device, such that the window 214 can be cleaned with minimal operator effort. In some embodiments, tape can be disposed around the outside edge of the window 214 in order to prevent light deflection and to prevent light from escaping or minimize the amount of light that escapes from the photoreactor 200.

In some embodiments, the window 214 can have a thickness of at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the window 214 can have a thickness of no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, or no more than about 200 μm. Combinations of the above-referenced thicknesses for the window 214 are also possible (e.g., at least about 100 μm and no more than about 1 cm or at least about 1 mm and no more than about 5 mm), inclusive of all values and ranges therebetween. In some embodiments, the window 214 can have a thickness of at about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, or about 1 cm.

As shown, a sealing device 232 (e.g., gasket or O-ring) is disposed between the housing 212 and the window 214. In some embodiments, the sealing device 232 can be disposed around the outside edge of the window 214. In some embodiments, the sealing device 232 can be disposed on a side of the window 214 distal to the housing 212. In other words, the window 214 can be disposed between the housing 212 and the sealing device 232. In some embodiments, multiple sealing devices 232 can be disposed on either side of the window 214 and/or around the outside edge of the window 214. In some embodiments, the housing 212 can be composed of a polymer (e.g., polytetrafluoroethylene, polypropylene, polystyrene). In some embodiments, the housing 212 can be composed of a metal (e.g., aluminum, steel, titanium). In some embodiments, the housing 212 can be opaque or substantially opaque. In some embodiments, the housing 212 can be connected to the bracket 216 via a plurality of fasteners. In some embodiments, the housing 212 can have a depth dimension defining the distance between the window 214 and the bracket 216. In some embodiments, the depth dimension of the housing 212 can be less than about 50 cm, less than about 40 cm, less than about 30 cm, less than about 20 cm, less than about 10 cm, less than about 9 cm, less than about 8 cm, less than about 7 cm, less than about 6 cm, less than about 5 cm, less than about 4 cm, less than about 3 cm, less than about 2 cm, or less than about 1 cm, inclusive of all values and ranges therebetween. In some embodiments, the depth dimension of the housing 212 can be greater than about 1 cm, greater than about 2 cm, greater than about 3 cm, greater than about 4 cm, greater than about 5 cm, greater than about 6 cm, greater than about 7 cm, greater than about 8 cm, greater than about 9 cm, greater than about 10 cm, greater than about 20 cm, greater than about 30 cm, greater than about 40 cm, or greater than about 50 cm.

In some embodiments, the bracket 216 can be composed of a metal (e.g., stainless steel, aluminum, titanium). In some embodiments, the bracket 216 can be composed of a polymer (e.g., polytetrafluoroethylene, polypropylene, polystyrene). In some embodiments, the bracket 216 can include a plurality of holes for the dissipation of heat. In some embodiments, the housing 212, window 214, and bracket 216 can all be fastened together to create a single structure. In some embodiments, the bracket 216 can include a reflective surface disposed in the inner volume 218. In some embodiments, the reflective surface can reflect light back toward the tubing 220. In other words, photons emitted from the lighting system 240 that do not interact with the tubing 220 on an initial pass can be reflected back toward the tubing 220. This can improve the efficiency of the photoreactor 200, as a larger percentage of the light emitted from the lighting system 240 can ultimately aid reactions occurring in the tubing 220. In some embodiments, the reflective surface can aid in preventing light transmission through the bracket 216 and the side of the reactor flow system 210 adjacent to the bracket 216. In some embodiments, the reflective surface can include a mirror.

In some embodiments, the tubing 220 can be composed of a flexible material, such that the tubing 220 can be coiled around the support members 224. Coiling the tubing 220 around the support members 224 can elongate the flow path of a reagent fluid flowing through the tubing 220. This flow path elongation can give way to a relatively long residence time of the reagent fluid within the reactor flow system 210, thereby maximizing its exposure to the incident photons. In addition to the ability to coil the flexible tubing material around the support members 224, flexible tubing material can also be replaced easily. In some embodiments, the tubing 220 material can also be translucent or substantially transparent. In some embodiments, the tubing 220 can be composed of a clear plastic flexible material, including PVC, ethyl vinyl acetate, Nylon®, polyethylene, polyketones (PEEK, PEK, PEKK), polypropylene, polyurethane, and any other translucent or substantially transparent material.

In some embodiments, the tubing 220 can be held in place by support members 224. In some embodiments, the support members 224 can be held in place by one or more support rails 226. In some embodiments, the reactor flow system 210 can include 1, 2, 3, 4, 5, 6, 7, 8, 9, 10, or more support members 224. In some embodiments, the support members 224 can be oriented vertically. In some embodiments, the support members 224 can be oriented horizontally. In some embodiments, the reactor flow system 210 can include vertical and horizontal support members. In some embodiments, the support rails 226 and support members 224 can be composed of polycarbonate, a metal (e.g., stainless steel, aluminum, titanium), or a polymer (e.g., polytetrafluoroethylene, polypropylene, polystyrene). In some embodiments, the support members 226 can include one of more support rods. In some embodiments, the support rods can have ridges that hold the tubing 220 in place and aid in preventing lateral movement of the tubing 220 along the length of the support rods.

As described herein, the inlet port 228 and outlet port 230 are fluidically coupled to the tubing 220. In some embodiments, the reactor inlet port 228 can be threaded into the housing 212 and connected to the tubing 220 within the inner volume 218 of the reactor flow system 210. In some embodiments, a hose clamp (not shown) can seal the connection between the tubing 220 and the inlet port 228 and the connection between the tubing 220 and the reactor outlet port 230. In some embodiments, the inlet port 228 can be connected to an inlet tube (not shown) on the exterior of the reactor flow system 210. In some embodiments, the inlet port 228 can be composed of a polymer, ceramic, or metal material, including delrin acetal homopolymer, PEEK, Torlon®, Teflon®, alumina, zirconia, aluminum, stainless steel, carbon steel, and titanium. In some embodiments, the outlet port 230 can similarly be threaded into the housing 212 and connected to the tubing 220 within the inner volume 218 of the reactor flow system 210. In some embodiments, the outlet port 230 can be connected to an outlet tube (not shown) on the exterior of the reactor flow system 210. In some embodiments, the outlet port 230 can be a quick-disconnect tube coupling. In some embodiments, the outlet port 230 can be composed of a polymer, ceramic, or metal material, including delrin acetal homopolymer, PEEK, Torlon®, Teflon®, alumina, zirconia, aluminum, stainless steel, carbon steel, and titanium. In some embodiments, the inlet tube can be fluidically coupled to an inlet pump (not shown). In some embodiments, the inlet tube can be fluidically coupled to a reservoir of reagent. In some embodiments, the outlet tube can be fluidically coupled to an outlet pump (not shown). In some embodiments, the outlet tube can be fluidically coupled to a reservoir of product. In some embodiments, the inlet pump can control the flow rate of reagent through the photoreactor 200. In some embodiments, the outlet pump can control the flow rate of reagent through the photoreactor 200. In some embodiments, the flow rate of reagent through the photoreactor 100 can be less than about 1 l/min, less than about 900 ml/min, less than about 800 ml/min, less than about 700 ml/min, less than about 600 ml/min, less than about 500 ml/min, less than about 400 ml/min, less than about 300 ml/min, less than about 200 ml/min, less than about 100 ml/min, less than about 90 ml/min, less than about 80 ml/min, less than about 70 ml/min, less than about 60 ml/min, less than about 50 ml/min, less than about 40 ml/min, less than about 30 ml/min, less than about 20 ml/min, less than about 10 ml/min, less than about 5 ml/min, or less than about 1 ml/min, inclusive of all values and ranges therebetween. In some embodiments, the flow rate of reagent through the photoreactor 100 can be greater than about 1 ml/min, greater than about 5 ml/min, greater than about 10 ml/min, greater than about 20 ml/min, greater than about 30 ml/min, greater than about 40 ml/min, greater than about 50 ml/min, greater than about 60 ml/min, greater than about 70 ml/min, greater than about 80 ml/min, greater than about 90 ml/min, greater than about 100 ml/min, greater than about 200 ml/min, greater than about 300 ml/min, greater than about 400 ml/min, greater than about 500 ml/min, greater than about 600 ml/min, greater than about 700 ml/min, greater than about 800 ml/min, greater than about 900 ml/min, or greater than about 1 l/min, inclusive of all values and ranges therebetween. In some embodiments, the tubing 220, the support members 224, and the support rails 226 can be held in place by simple grooves in order to facilitate easy removal and replacement.

Figure 4:
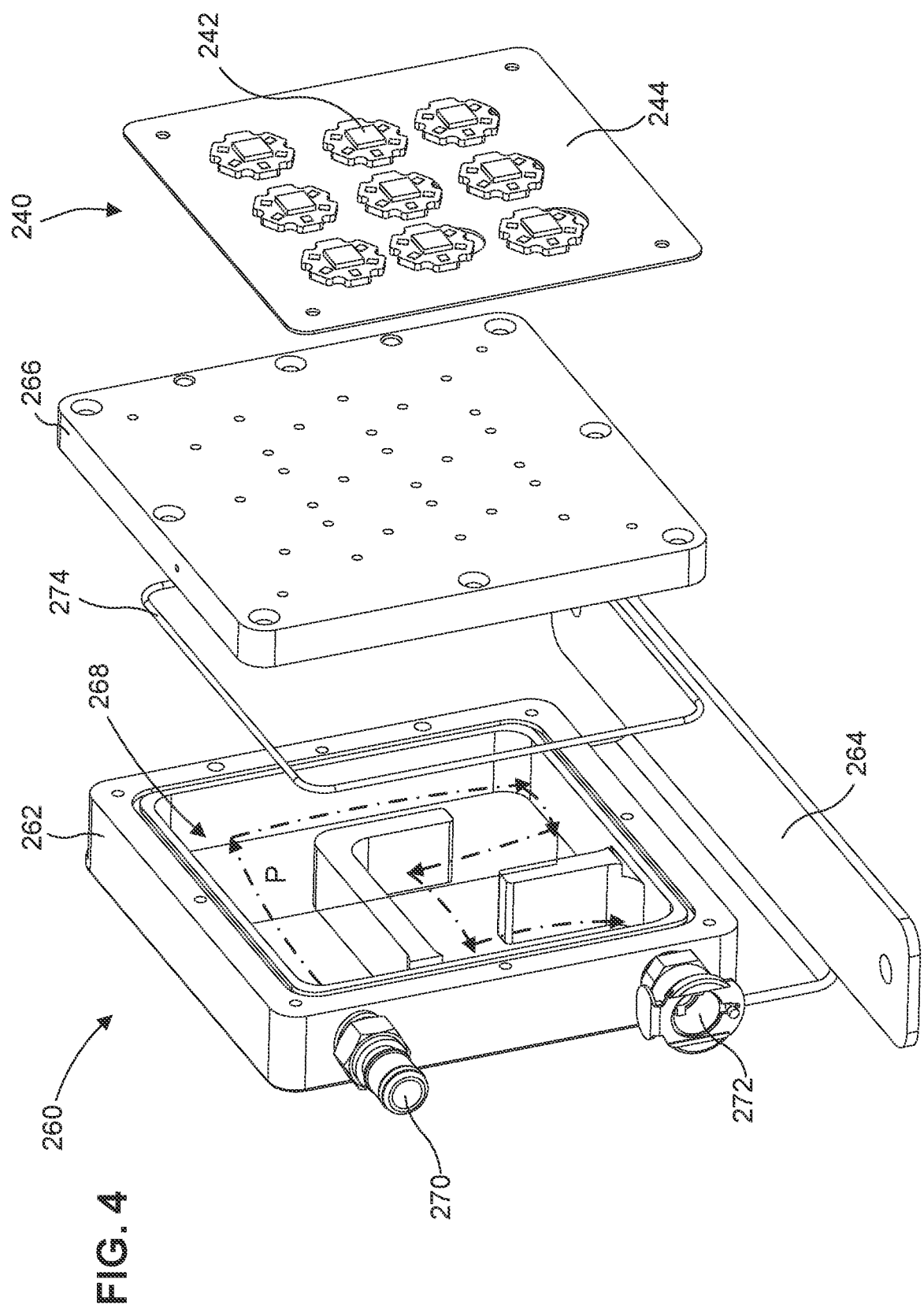
FIG. 4 is an exploded view of a lighting system and a temperature control system, according to an embodiment.

Referring now also to FIG. 4, the lighting system 240 and the temperature control system 260 are shown in greater detail. As shown, the lighting system 240 and the temperature control system 260 are housed in the same structure. In other words, the lighting system 240 and the temperature control system 240 are physically coupled together. In some embodiments, the lighting system 240 and the temperature control system 260 can be housed in different structures. As shown, the structure that houses the reactor flow system 210 is spaced apart from the structure that houses the lighting system 240 and the temperature control system 260 by a horizontal distance d. In some embodiments, d can be at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, or at least about 9 cm. In some embodiments, d can be no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, or no more than about 1 mm. Combinations of the above-referenced values for d are also possible (e.g., at least about 1 mm and no more than about 10 cm or at least about 3 mm and no more than about 1 cm), inclusive of all values and ranges therebetween. In some embodiments, d can be about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, or about 9 cm, or about 10 cm. In some embodiments, d can be about 0 mm. In other words, the structure that houses the reactor flow system 210 can be flush with the structure that houses the lighting system 240 and the temperature control system 260, such that there is no horizontal gap between the structure that houses the reactor flow system 210 and the structure that houses the lighting system 240 and the temperature control system 260.

As shown, the lighting system 240 includes a plurality LEDs 242 and a cover 244. In some embodiments, the lighting system 240 can include only one LED 242. In some embodiments, the lighting system 240 can include more than 1, more than 2, more than 3, more than 4, more than 5, more than 6, more than 7, more than 8, more than 9, at least about 10, at least about 15, at least about 20, at least about 30, at least about 50, at least about 75, or more than 100 LEDs 242. In some embodiments, the LEDs 242 can be commercial high power Chip on Board (COB) LEDs.

In some embodiments, each LED 242 can have a power output of about 5 watts, about 10 watts, about 15 watts, about 20 watts, about 30 watts, or about 40 watts. In some embodiments, each LED 242 can have a power output of less than about 50 watts, less than about 40 watts, less than about 30 watts, less than about 20 watts, less than about 15 watts, less than about 10 watts, or less than about 5 watts. In some embodiments, the wavelength of the radiation emitted by the LEDs 242 can be less than about 390 nm, between about 390 nm and about 400 nm, between about 400 nm and about 410 nm, between about 410 nm and about 420 nm, between about 420 nm and about 430 nm, between about 430 nm and about 440 nm, between about 440 nm and about 450 nm, between about 450 nm and about 460 nm, between about 460 nm and about 470 nm, between about 480 nm and about 490 nm, between about 490 nm and about 500 nm, or greater than about 500 nm, inclusive of all values and ranges therebetween.

In some embodiments, the LEDs 242 can be electrically coupled to a power supply unit (not shown). In some embodiments, the power supply unit can be mounted to a structure that includes the lighting system 240. In some embodiments, the power supply unit can include banana jacks for a connection to an electrical source. The LEDs 242 are coupled to the cover 244, which isolates the LED wiring from the ambient atmosphere. In some embodiments, the cover 244 can be composed of a metal (e.g., stainless steel, aluminum, titanium, etc.), a polymer, or a ceramic. In some embodiments, a glare shield (not shown) can be included to block and reflect a portion of the light radiated from the LEDs 242 in a direction away from the reactor flow system 210, and guide the light toward the reactor flow system 210. The glare shield can help direct a greater amount of energy radiated from the LEDs 242 into the reactor flow system 210.

In some embodiments, a protective plate (not shown) can be fastened to the cover 244 on the side of the cover distal to the housing 262. In some embodiments, the protective plate can protect the LEDs 242 from dust, dirt, water, and damage. In some embodiments, the protective plate can be composed of glass, tinted glass, or any other translucent or substantially transparent material. In some embodiments, the protective plate can have a thickness of at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the protective plate can have a thickness of no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced thicknesses for the protective plate are also possible (e.g., at least about 100 µm and no more than about 1 cm or at least about 1 mm and no more than about 5 mm), inclusive of all values and ranges therebetween. In some embodiments, the protective plate can have a thickness of at about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, or about 1 cm.

The temperature control system 260 includes a housing 262, a sleeve 263, a bracket 264, and a heatsink body 266 that collectively define an inner volume 268. In some embodiments, the bracket 264 can be in physical contact with the housing 262. In some embodiments, the bracket 264 can be secured to the housing 262 by a plurality of fasteners. In some embodiments, the bracket 264 can be composed of a metal (e.g., stainless steel, aluminum, titanium). In some embodiments, the bracket 264 can be composed of a polymer (e.g., polytetrafluoroethylene, polypropylene, polystyrene). In some embodiments, the bracket 264 can include a plurality of holes for the dissipation of heat.

The heatsink body 266 transfers heat from the lighting system 240 to the temperature control system 260. As shown, a sealing device 274 (e.g., gasket or O-ring) is disposed between the heatsink body 266 and the housing 262 to create a fluid-tight seal. In some embodiments, the temperature control system 260 and the lighting system 240 can be in physical contact with each other, and the housing 262, bracket 264, and heatsink body 266 can be held together by a series of fasteners and/or mechanical couplings. In some embodiments, the heatsink body 266 can be disposed at an interface between the lighting system 240 and the temperature control system 260.

In some embodiments, the sleeve 263 can include a gasket. In some embodiments, the gasket can be disposed around an outside edge of the sleeve 263. In some embodiments, the gasket can be disposed around the outside edge of the sleeve 263 adjacent to the structure that houses the reactor flow system 210. If the structure that houses the lighting system 240 and the temperature control system 260 is flush with the structure that houses the reactor flow system 210 (i.e., d is about 0 mm), a gasket disposed around the outside edge of the sleeve adjacent to the structure that houses the reactor flow system 210 can prevent light leakage during transfer of light from the lighting system 240 to the reactor flow system 210. In some embodiments, the gasket can be composed of rubber or any suitable material that can create a seal. In some embodiments, the gasket can form a tight seam with the outside edges of the window 214. In some embodiments, the gasket can be a separate component from the sleeve 263 and the gasket can be disposed between the sleeve 263 and the outside edges of the window 214. In some embodiments, the gasket can be composed of a UV-rated material. In some embodiments, the gasket can be composed of a UV-rated rubber material.

In some embodiments, a bracket gasket can be disposed between the sleeve 263 and the bracket 264. In some embodiments, the bracket gasket can be composed of rubber or any suitable material that can create a seal. In some embodiments, the bracket gasket can be composed of a UV-rated material. In some embodiments, the bracket gasket can be composed of a UV-rated rubber material.

As shown, substantially all of the components of the reactor flow system 210 are disposed in or physically coupled to the housing 212. As shown, substantially all of the components of the lighting system 240 and the temperature control system 260 are disposed in or physically coupled to the housing 262. There are several advantages to including the reactor flow system 210 in a first housing and the lighting system 240 and temperature control system 260 in a second housing. Including the lighting system 240 and the temperature control system 260 in the same housing allows the temperature control system 260 to affect the function and performance of the lighting system 240 while still maintaining independent control of the lighting system 240 and the temperature control system 260. Conversely, the lighting system 240 can affect the function and performance of the temperature control system 260 while maintaining independent control of the lighting system 240 and the temperature control system 260.

In some embodiments, the heatsink body 266 can be in physical contact with the LEDs 242 and/or the cover 244. In some embodiments, the heatsink body 266 can include a plurality of apertures for heat dissipation. In some embodiments, the heatsink body 266 can be composed of a metal (e.g., stainless steel, aluminum, titanium, etc.) and/or any other thermally conductive material. In some embodiments, the heatsink body 266 can have a thickness of greater than about 1 mm, greater than about 2 mm, greater than about 3 mm, greater than about 4 mm, greater than about 5 mm, greater than about 6 mm, greater than about 7 mm, greater than about 8 mm, greater than about 9 mm, greater than about 1 cm, greater than about 2 cm, greater than about 3 cm, greater than about 4 cm, or greater than about 5 cm, inclusive of all values and ranges therebetween. In some embodiments, the heatsink body 266 can have a thickness of less than about 5 cm, less than about 4 cm, less than about 3 cm, less than about 2 cm, less than about 1 cm, less than about 9 mm, less than about 8 mm, less than about 7 mm, less than about 6 mm, less than about 5 mm, less than about 4 mm, less than about 3 mm, less than about 2 mm, or less than about 1 mm, inclusive of all values and ranges therebetween.

The temperature control system 260 includes an inlet port 270 and an outlet port 272, and the inner volume 268 that defines a fluid flow path P between the inlet port 270 and the outlet port 272. In some embodiments, the fluid flow path P can follow a tortuous path through a network of baffles within the inner volume 268 of the housing 262. The tortuous path can help maximize the residence time of the fluid within the housing 262 and maximize the fluid's contact with the heatsink body 266. In some embodiments, the inner volume 268 can include tubing (not shown), fluidically coupled to the inlet port 270 and the outlet port 272. In some embodiments, the tubing can be composed of a metal (e.g., stainless steel, aluminum, titanium, etc.) and/or any other thermally conductive material. In some embodiments, the tubing can be composed of a flexible plastic tubing material, including PVC, ethyl vinyl acetate, Nylon®, polyethylene, polyketones (PEEK, PEK, PEKK), polypropylene, polyurethane, and any other flexible tubing material. As shown, the fluid flow path P runs from the top of the inner volume 268 of the housing 262 to the bottom of the inner volume 268 of the housing 262. In other words, the inlet port 270 is shown placed near the top of the housing 262 and the outlet port 272 placed near the bottom of the housing 262. In some embodiments, the fluid flow path P can run from the bottom of the inner volume 268 of the housing 262 to the top of the inner volume 268 of the housing 262. In other words the inlet port 270 can be placed near the bottom of the housing 262 and the outlet port 272 can be placed near the top of the housing 262.

In some embodiments, the inlet port 270 and outlet port 272 can be threaded into the housing 262. In some embodiments, the inlet port 270 and/or the outlet port 272 can be a quick-disconnect tube coupling. In some embodiments, the inlet port 270 and outlet port 272 can be composed of a polymer, ceramic, or metal material, including delrin acetal homopolymer, PEEK, Torlon®, Teflon®, alumina, zirconia, aluminum, stainless steel, carbon steel, and titanium.

In some embodiments, the fluid can flow through a closed loop system that includes a refrigeration unit (not shown) and/or a heating unit (not shown). In some embodiments, the inlet port 270 can be connected to an inlet tube (not shown) on the exterior of the temperature control system 260. In some embodiments, the outlet port 272 can be connected to an outlet tube (not shown) on the exterior of the temperature control system 260. In some embodiments, the inlet tube and/or the outlet tube can be fluidically coupled to one or more pumps that circulate the fluid through the refrigeration unit and/or heating unit.

In some embodiments, the heatsink body 266 can include a flow path (not shown), such that a fluid can flow through the heatsink body 266 for additional cooling. In some embodiments, the heatsink body 266 can include an inlet port (not shown) and an outlet port (not shown) fluidically coupled to the cooling path disposed in the heatsink body 266. In some embodiments, the fluid that flows through the heatsink body 266 can be the same as the fluid that flows through the inner volume 268. In some embodiments, the fluid that flows through the heatsink body 266 can be different from the fluid that flows through the inner volume 268.

In some embodiments, the fluid that flows through the heatsink body 266 can come from the same source (or reservoir) as the fluid that flows through the inner volume 268. In other words, the flow path through the heatsink body 266 can be in fluidic communication with the inner volume 268. This would effectively make the inner volume 268 and the flow path through the heatsink body 266 part of the same temperature control system. In some embodiments, the fluid that flows through the heatsink body 266 can be different from the fluid that flows through the inner volume 268. In some embodiments, the fluid that flows through the heatsink body 266 can come from a different source (or reservoir) than the fluid that flows through the inner volume 268. In other words, the flow path through the heatsink body 266 can be fluidically isolated from the inner volume 268. This would effectively make the inner volume 268 part of a first temperature control system and the flow path through the heatsink body 266 part of a second temperature control system.

In some embodiments, the reactor flow system 210 can include a cooling flow path (not shown), such that a fluid can flow through the inner volume 218 of the housing 212 for additional cooling. In some embodiments, the housing 212 can include a cooling inlet port (not shown) and a cooling outlet port (not shown) fluidically coupled to the inner volume 218. In some embodiments, the inner volume 218 can include a cooling tubing (not shown) or a cooling flow path (not shown) fluidically coupled to the cooling inlet port and the cooling outlet port. In some embodiments, the temperature control fluid that flows through the inner volume 218 can be the same as the fluid that flows through the inner volume 268 and/or the fluid that flows through the heatsink body 266. In some embodiments, the temperature control fluid that flows through the inner volume 218 can be different from the fluid that flows through the inner volume 268 and/or the fluid that flows through the heatsink body 266.

In some embodiments, the temperature control fluid that flows through the inner volume 218 can come from the same source (or reservoir) as the fluid that flows through the inner volume 268 and/or the heatsink body 266. In other words, the flow path the temperature control fluid follows through the inner volume 218 can be in fluidic communication with the inner volume 268 and/or the heatsink body 266. This would effectively make the flow path the temperature control fluid follows through the inner volume 218 part of the same temperature control system as the flow path P through the inner volume 268 and/or the flow path through the heatsink body 266. In some embodiments, the temperature control fluid that flows through the inner volume 218 can come from a different source (or reservoir) from the fluid that flows through the inner volume 268 and/or the fluid that that flows through the heatsink body 266. In other words, the flow path the fluid follows through the inner volume 218 can be fluidically isolated from the inner volume and/or the heatsink body 266. This would effectively make the flow path the temperature control fluid follows through the inner volume 218 part of a different temperature control system from the flow path P through the inner volume 268 and/or the flow path through the heatsink body 266.

In some embodiments, the temperature control fluid that flows through the inner volume 218, the fluid that flows through the heatsink body 266, and/or the fluid that flows through the inner volume 268 can include glycol, water, ethanol, methanol, or any other fluid able to absorb heat without facilitating any significant side reactions.

In some embodiments, the flow rate of the temperature control fluid that flows through the inner volume 218, the fluid that flows through the heatsink body 266, and/or the fluid that flows through the inner volume 268 can be at least about 1 ml/min, at least about 5 ml/min, at least about 10 ml/min, at least about 20 ml/min, at least about 30 ml/min, at least about 40 ml/min, at least about 50 ml/min, at least about 60 ml/min, at least about 70 ml/min, at least about 80 ml/min, at least about 90 ml/min, at least about 100 ml/min, at least about 200 ml/min, at least about 300 ml/min, at least about 400 ml/min, at least about 500 ml/min, at least about 600 ml/min, at least about 700 ml/min, at least about 800 ml/min, or at least about 900 ml/min. In some embodiments, the flow rate of the temperature control fluid that flows through the inner volume 218, the fluid that flows through the heatsink body 266, and/or the fluid that flows through the inner volume 268 can be no more than about 1 l/min, no more than about 900 ml/min, no more than about 800 ml/min, no more than about 700 ml/min, no more than about 600 ml/min, no more than about 500 ml/min, no more than about 400 ml/min, no more than about 300 ml/min, no more than about 200 ml/min, no more than about 100 ml/min, no more than about 90 ml/min, no more than about 80 ml/min, no more than about 70 ml/min, no more than about 60 ml/min, no more than about 50 ml/min, no more than about 40 ml/min, no more than about 30 ml/min, no more than about 20 ml/min, no more than about 10 ml/min, or no more than about 5 ml/min, inclusive of all values and ranges therebetween.

Combinations of the above-referenced flow rates of the temperature control fluid that flows through the inner volume 218, the fluid that flows through the heatsink body 266, and/or the fluid that flows through the inner volume 268 are also possible (e.g., at least about 1 ml/min and no more than about 1 l/min or at least about 10 ml/min and no more than about 100 ml/min), inclusive of all values and ranges therebetween. In some embodiments, the flow rate of the temperature control fluid that flows through the inner volume 218, the fluid that flows through the heatsink body 266, and/or the fluid that flows through the inner volume 268 can be about 1 ml/min, about 5 ml/min, about 10 ml/min, about 20 ml/min, about 30 ml/min, about 40 ml/min, about 50 ml/min, about 60 ml/min, about 70 ml/min, about 80 ml/min, about 90 ml/min, about 100 ml/min, about 200 ml/min, about 300 ml/min, about 400 ml/min, about 500 ml/min, about 600 ml/min, about 700 ml/min, about 800 ml/min, about 900 ml/min, or about 1 l/min.

In some embodiments, the flow rate of reagent through the photoreactor 200 can be at least about 1 ml/min, at least about 5 ml/min, at least about 10 ml/min, at least about 20 ml/min, at least about 30 ml/min, at least about 40 ml/min, at least about 50 ml/min, at least about 60 ml/min, at least about 70 ml/min, at least about 80 ml/min, at least about 90 ml/min, at least about 100 ml/min, at least about 200 ml/min, at least about 300 ml/min, at least about 400 ml/min, at least about 500 ml/min, at least about 600 ml/min, at least about 700 ml/min, at least about 800 ml/min, at least about 900 ml/min, or at least about 1 l/min, inclusive of all values and ranges therebetween. In some embodiments, the flow rate of reagent through the photoreactor 200 can be no more than about 2 l/min, no more than about 1 l/min, no more than about 900 ml/min, no more than about 800 ml/min, no more than about 700 ml/min, no more than about 600 ml/min, no more than about 500 ml/min, no more than about 400 ml/min, no more than about 300 ml/min, no more than about 200 ml/min, no more than about 100 ml/min, no more than about 90 ml/min, no more than about 80 ml/min, no more than about 70 ml/min, no more than about 60 ml/min, no more than about 50 ml/min, no more than about 40 ml/min, no more than about 30 ml/min, no more than about 20 ml/min, no more than about 10 ml/min, or no more than about 5 ml/min.

Combinations of the above-referenced flow rates of reagent through the photoreactor 200 are also possible (e.g., at least about 1 ml/min and no more than about 2 l/min or at least about 10 ml/min and no more than about 100 ml/min), inclusive of all values and ranges therebetween. In some embodiments, the flow rate of reagent through the photoreactor 200 can be about 1 ml/min, 5 ml/min, about 10 ml/min, about 20 ml/min, about 30 ml/min, about 40 ml/min, about 50 ml/min, about 60 ml/min, about 70 ml/min, about 80 ml/min, about 90 ml/min, about 100 ml/min, about 200 ml/min, about 300 ml/min, about 400 ml/min, about 500 ml/min, about 600 ml/min, about 700 ml/min, about 800 ml/min, about 900 ml/min, about 1 l/min, or about 2 l/min.

Figure 5A:
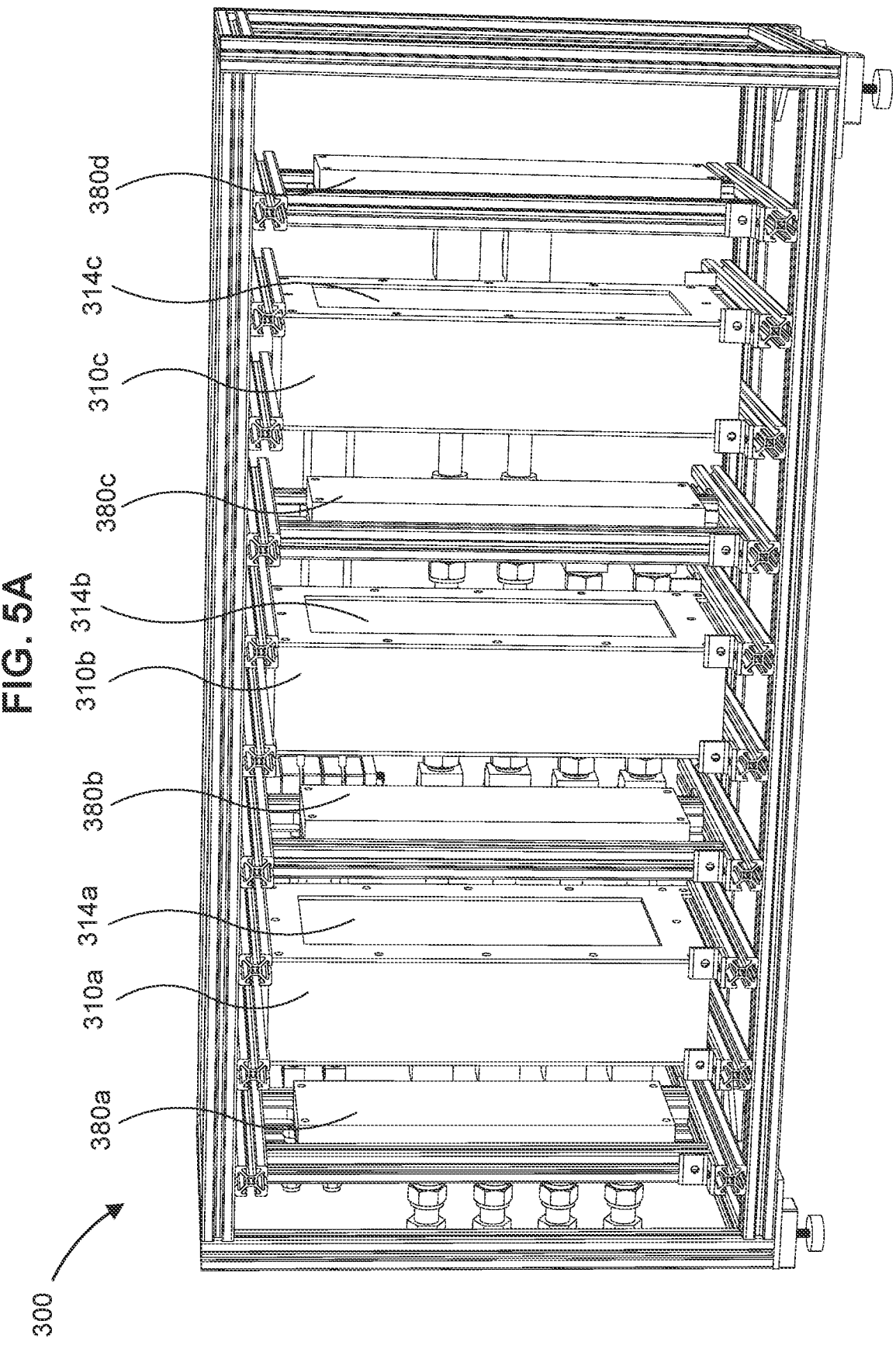

FIGS. 5A-5B illustrate a photoreactor 300, according to an embodiment. As shown, the photoreactor 300 includes multiple reactor flow systems 310a, 310b, 310c (collectively referred to herein as reactor flow systems 310) and multiple lighting/temperature control structures 380a, 380b, 380c, 380d (collectively referred to herein as lighting/temperature control structures 380), wherein each of the lighting/temperature control structures 380 includes both a lighting system and a temperature control system. The reactor flow systems 310, the lighting systems, and the temperature control systems can each be substantially similar or the same as the reactor flow system 110, 210, lighting system 140, 240, and temperature control system 160, 260 as described above with reference to FIGS. 1-4. In some embodiments, the LEDs on each lighting system can be a first set of LEDs, and the lighting system can include a second set of LEDs, that radiates light in the opposite direction of the first set of LEDs. For example, the first set of LEDs can radiate light towards the reactor flow system 310a and the second set of LEDs can radiate light towards the reactor flow system 310b. In some embodiments, each of the reactor flow systems 310 can include a first window 314a, 314b, 314c (collectively referred to herein as first windows 314) and a second window 315a, 315b, 315c (collectively referred to herein as second windows 315) on the opposite side of each of the reactor flow systems 310 from each of the first windows 314. This can allow light to radiate from multiple lighting systems to the reactor flow systems 310 from multiple sides of each of the reactor flow systems 310.

Figure 6:
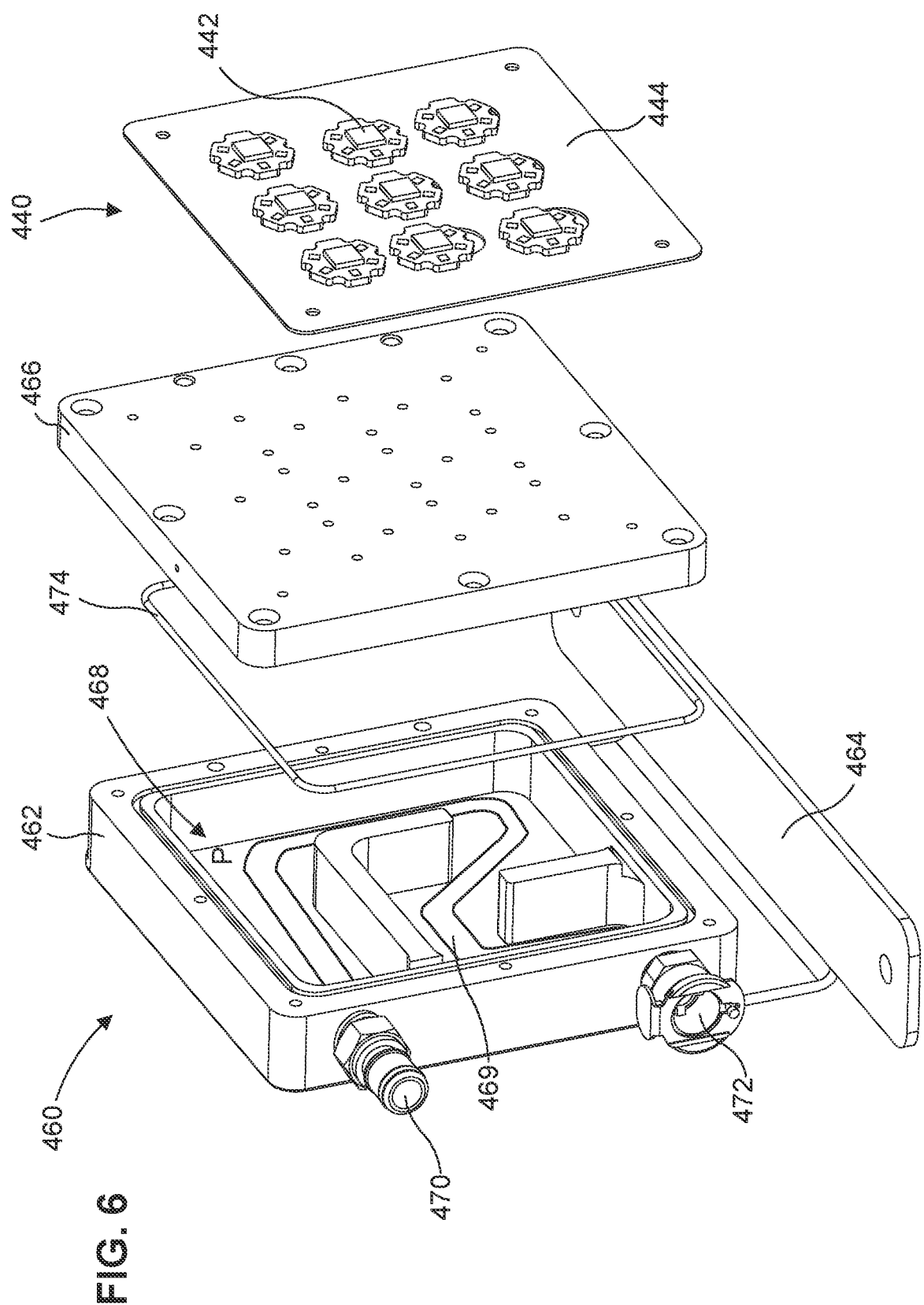
FIG. 6 is an exploded view of a lighting system and a temperature control system, according to an embodiment.

FIG. 6 is an exploded view of a lighting system 440 and a temperature control system 460, according to an embodiment. As shown, the lighting system 440 includes a plurality of LEDs 442 and a cover 444. The temperature control system 460 includes a housing 462, a sleeve 463, a bracket 464, and a heatsink body 466 that collectively define an inner volume 468. The temperature control system 460 further includes an inlet port 470, an outlet port 472, and a temperature control tubing 469. In some embodiments, the plurality of LEDs 442, the cover 444, the housing 462, the sleeve 463, the bracket 464, the heatsink body 466, the inner volume 468, the inlet port 470, and the outlet port 472 can be the same or substantially similar to the plurality of LEDs 242, the cover 244, the housing 262, the sleeve 263, the bracket 264, the heatsink body 266, the inner volume 268, the inlet port 270, and the outlet port 272, as described above with reference to FIG. 4. Thus, certain aspects of the plurality of LEDs 442, the cover 444, the housing 462, the sleeve 463, the bracket 464, the heatsink body 466, the inner volume 468, the inlet port 470, and the outlet port 472 are not described in greater detail herein. The temperature control tubing 469 is fluidically coupled to the inlet port 470 and the outlet port 472. As shown, the lighting system 440 and the temperature control system 460 form a housing. The temperature control tubing 469 is disposed in the housing and is fluidically coupled to the inlet port 470 and the outlet port 472.

Figure 7:
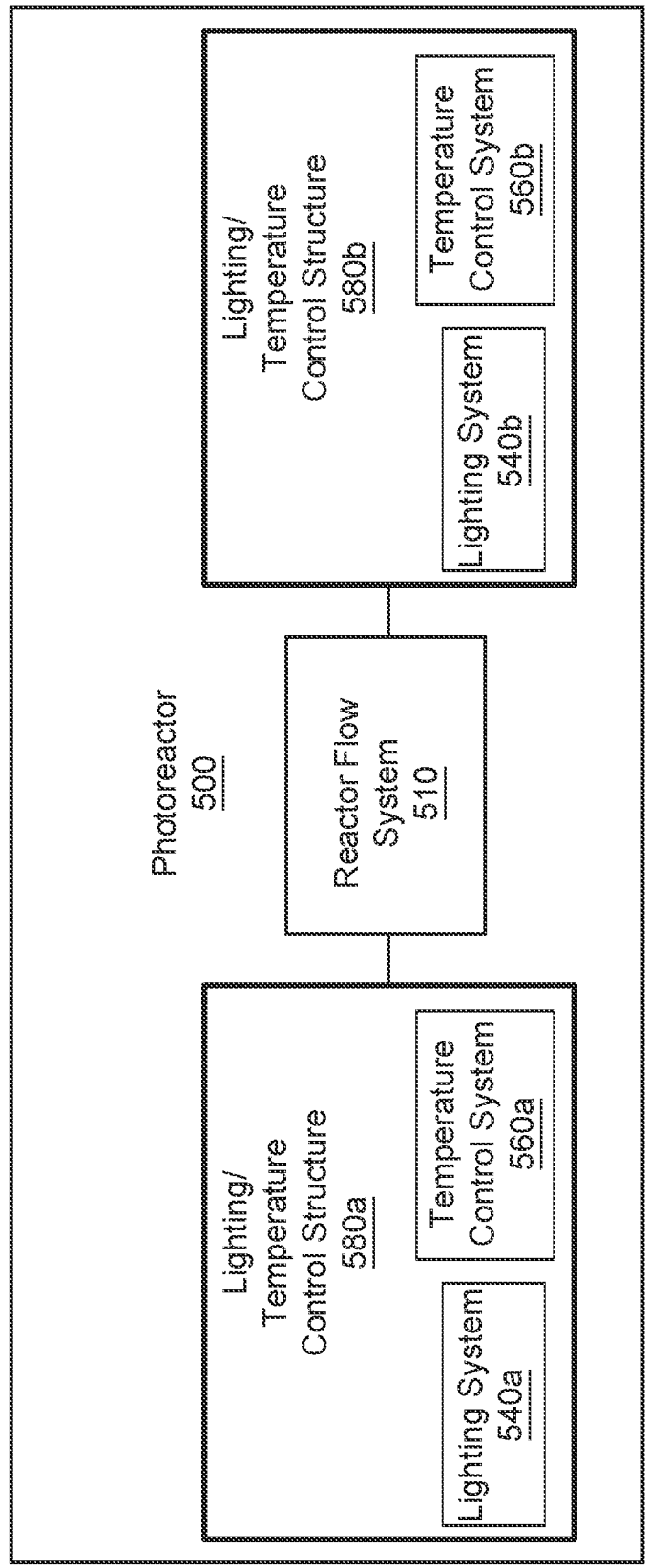
FIG. 7 is a schematic illustration of a photoreactor, according to an embodiment.

FIG. 7 is a schematic illustration of a photoreactor 500, according to an embodiment. As shown, the photoreactor 500 includes a reactor flow system 510, a first lighting/temperature control structure 580*a* including a first lighting system 540*a* and a first temperature control system 560*a*, and a second lighting/temperature control structure 580*b* including a lighting system 540*b* and a temperature control system 560*b*. In some embodiments, the reactor flow system 510 and the lighting/temperature control structures 580*a*, 580*b* can be the same or substantially similar to the reactor flow systems 310 and the lighting/temperature control structures 380, as described above with reference to FIGS. 5A-5B. Thus, certain aspects of the reactor flow system 510 and the lighting/temperature control structures 580*a*, 580*b* are not described in greater detail herein. As shown, the first temperature control system 560*a* and the second temperature control system 560*b* both cool the reactor flow system 510. This can be indirect cooling via the cooling of the lighting systems 540*a*, 540*b*.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A photoreactor, comprising:
a reactor flow system including a reactor inlet port and a reactor outlet port coupled to a first housing, and a length of reactor tubing fluidically coupled to the reactor inlet port and the reactor outlet port and disposed inside the first housing;
a lighting system configured to emit light in a defined wavelength range toward the length of reactor tubing; and
a temperature control system including an inlet port and an outlet port coupled to a second housing, and a length of temperature control tubing fluidically coupled to the inlet port and the outlet port, the temperature control system configured to circulate a fluid to cool the lighting system, the second housing separated from the first housing by a separation distance of at least about 5 mm.

2. The photoreactor of claim 1, wherein the lighting system and the temperature control system are disposed in the second housing.

3. The photoreactor of claim 2, wherein the temperature control tubing physically contacts the lighting system.

4. The photoreactor of claim 3, wherein the temperature control tubing follows a tortuous path through a series of baffles from the inlet port to the outlet port.

5. The photoreactor of claim 2, wherein the lighting system includes a plurality of LEDs.

6. The photoreactor of claim 1, further comprising:
a heatsink body disposed between the lighting system and the temperature control system.

7. The photoreactor of claim 6, wherein the temperature control system is a first temperature control system, the photoreactor further comprising:
a second temperature control system disposed and configured to cool the heatsink body.

8. The photoreactor of claim 1, wherein the defined wavelength range is between about 390 nm and about 500 nm.

9. The photoreactor of claim 1, wherein the reactor tubing is coiled around a member disposed in the reactor flow system.

10. The photoreactor of claim 1, wherein the reactor flow system includes a window, through which incident light from the lighting system permeates.

11. The photoreactor of claim 1, wherein the temperature control system is a first temperature control system, the photoreactor further comprising:
a second temperature control system disposed and configured to cool the reactor flow system.

12. The photoreactor of claim 1, wherein the separation distance is at least about 1 cm.

13. A photoreactor, comprising:
a first housing including a reactor inlet port, a reactor outlet port, and a length of reactor tubing disposed inside the first housing and fluidically coupled to the reactor inlet port and the reactor outlet port;
a second housing defining an inner volume and including an inlet port and an outlet port, the second housing separated from the first housing by a separation distance of at least about 5 mm;
a light source disposed in the inner volume of the second housing and configured to emit light toward the reactor tubing; and
a length of temperature control tubing disposed in the inner volume of the second housing, the length of temperature control tubing configured to transport a heat transfer fluid that draws heat from the light source.

14. The photoreactor of claim 13, wherein the second housing further comprises a heatsink body in physical contact with the light source.

15. The photoreactor of claim 13, wherein the light source includes a plurality of LEDs.

16. The photoreactor of claim 13, wherein the plurality of LEDs are electronically coupled to a power supply unit, the power supply unit physically coupled to the second housing.

17. The photoreactor of claim 13, wherein the reactor tubing is coiled around a member disposed in the first housing.

18. The photoreactor of claim 13, wherein the first housing includes a window, through which incident light from the light source permeates.

19. The photoreactor of claim 13, wherein the separation distance is at least about 1 cm.

20. A photoreactor, comprising:
a first reactor flow system including a first reactor inlet port and a first reactor outlet port coupled to a first housing, and a first length of reactor tubing fluidically coupled to the first reactor inlet port and the first reactor outlet port and disposed inside the first housing;
a second reactor flow system including a second reactor inlet port and a second reactor outlet port coupled to a second housing, and a second length of reactor tubing fluidically coupled to the second reactor inlet port and the second reactor outlet port and disposed inside the second housing, the second housing separated from the first housing by a separation distance of at least about 5 mm;
a lighting system disposed between the first reactor flow system and the second reactor flow system, the lighting system including a light source configured to emit light toward the first reactor flow system and the second reactor flow system; and
a temperature control system disposed and configured to cool the lighting system, the temperature control system including a length of temperature control tubing disposed in a third housing.

21. The photoreactor of claim 20, wherein the lighting system is a first lighting system and the temperature control system is a first temperature control system, further comprising:
a third reactor flow system including a third reactor inlet port, a third reactor outlet port, and a third length of reactor tubing fluidically coupled to the third reactor inlet port and the third reactor outlet port;
a second lighting system disposed between the second reactor flow system and the third reactor flow system, the second lighting system including a light source configured to emit light toward the second reactor flow system and the third reactor flow system; and
a second temperature control system disposed and configured to cool the second lighting system.

22. The photoreactor of claim 20, wherein the temperature control system is a first temperature control system, the first temperature control system including a first inlet port, a first outlet port, and a first flow path, the photoreactor further comprising:
a second temperature control system including a second inlet port, a second outlet port, and a second flow path disposed in at least one of the first reactor flow system and the second reactor flow system, the second inlet port and the second outlet port fluidically coupled to the second flow path.

23. The photoreactor of claim 20, wherein the lighting system includes a first plurality of LEDs configured to radiate light toward the first reactor flow system and a second plurality of LEDs configured to radiate light toward the second reactor flow system.

24. The photoreactor of claim 20, wherein the separation distance is at least about 1 cm.

* * * * *